(12) United States Patent
Tzidon et al.

(10) Patent No.: US 9,496,591 B2
(45) Date of Patent: Nov. 15, 2016

(54) ZINC-AIR BATTERY

(75) Inventors: Dekel Tzidon, Hod Hasharon (IL);
Jonathan R. Goldstein, Jerusalem (IL);
Avraham Yadgar, Kiryat Ono (IL)

(73) Assignee: PHINERGY LTD., Lod (IL)

( * ) Notice: Subject to any disclaimer, the term of this patent is extended or adjusted under 35 U.S.C. 154(b) by 0 days.

(21) Appl. No.: 14/117,643

(22) PCT Filed: May 16, 2012

(86) PCT No.: PCT/IL2012/050172
§ 371 (c)(1),
(2), (4) Date: Dec. 1, 2013

(87) PCT Pub. No.: WO2012/156972
PCT Pub. Date: Nov. 22, 2012

(65) Prior Publication Data
US 2014/0087274 A1    Mar. 27, 2014

Related U.S. Application Data (60) Provisional application No. 61/486,348, filed on May 16, 2011.

(51) Int. Cl.
*H01M 12/08* (2006.01)
*H01M 12/00* (2006.01)
*H01M 12/06* (2006.01)
(Continued)

(52) U.S. Cl.
CPC .............. *H01M 12/08* (2013.01); *H01M 2/02* (2013.01); *H01M 4/42* (2013.01); *H01M 8/04* (2013.01); *H01M 10/46* (2013.01); *H01M 10/48* (2013.01); *H01M 12/00* (2013.01); *H01M 12/06* (2013.01)

(58) Field of Classification Search
CPC ..................................................... H01M 12/08
See application file for complete search history.

(56) References Cited

U.S. PATENT DOCUMENTS

| 3,248,267 A | 4/1966 | Langer et al. |
| 3,551,208 A | 12/1970 | Stachurski |

(Continued)

FOREIGN PATENT DOCUMENTS

| FR | 2768264 A1 | 3/1999 | |
| GB | 1212482 | * 11/1970 | ............ H01M 92/02 |

(Continued)

OTHER PUBLICATIONS

Supplementary Partial European Search Report for European Application No. 12785155.8 dated Dec. 5, 2014.

(Continued)

*Primary Examiner* — Patrick Ryan
*Assistant Examiner* — Alex Usyatinsky
(74) *Attorney, Agent, or Firm* — Pearl Cohen Zedek Latzer Baratz LLP (57) ABSTRACT

The Invention provides a zinc-air cell comprising at least one zinc-incorporating structure, at least one oxygen evolving structure and at least one air electrode; wherein said zinc-air cell comprises a first pair of electrodes for the charging of said air cell, said electrode pair comprising said at least one zinc-incorporating structure and said at least one oxygen evolving structure; and wherein said zinc-air cell comprises a second pair of electrodes for the discharging of said air cell, said electrode pair comprising said at least one zinc-incorporating structure and said at least one air electrode.

16 Claims, 9 Drawing Sheets

(51) Int. Cl.
   *H01M 10/48* (2006.01)
   *H01M 8/04* (2016.01)
   *H01M 10/46* (2006.01)
   *H01M 2/02* (2006.01)
   *H01M 4/42* (2006.01)

(56) References Cited

U.S. PATENT DOCUMENTS

| | | | |
|---|---|---|---|
| 3,594,233 A | | 7/1971 | Charkey et al. |
| 3,650,837 A | * | 3/1972 | Palmer ..................... 429/403 |
| 3,682,706 A | | 8/1972 | Yardney et al. |
| 4,039,729 A | | 8/1977 | Benczur-Urmossy et al. |
| 4,113,921 A | * | 9/1978 | Goldstein et al. ............ 429/406 |
| 4,517,258 A | | 5/1985 | Bronoel |
| 5,250,370 A | * | 10/1993 | Faris ..................... 429/68 |
| 5,318,861 A | | 6/1994 | Harats et al. |
| 6,228,519 B1 | | 5/2001 | Faris et al. |

FOREIGN PATENT DOCUMENTS

| | | |
|---|---|---|
| GB | 1212482 A | 11/1970 |
| GB | 1238 356 A | 7/1971 |
| WO | WO 81/00032 A1 | 1/1981 |
| WO | WO 99/18628 | 4/1999 |

OTHER PUBLICATIONS

Armand et al.; "Building better batteries", Nature 451, 652-657 (2008).
Iacovangelo et al.; "Parametric Study of Zinc Deposition on Porous Carbon in a Flowing Electrolyte Cell", J. Electrochem. Soc., 1985, vol. 132, issue 4, 851-857.
Kinoshita; "Electrochemical Oxygen Technology", (Wiley-Interscience, New York, 1992).
Li et al.; "Advanced zinc-air batteries based on high-performance hybrid electrocatalysts", Nature Communications, 4:1805, pp. 1-7.
Sapkota et al.; "Zinc-air fuel cell, a potential candidate for alternativeenergy", J. Ind. Eng. Chem. 15, 445-450 (2009).
Smedley et al.; "A zinc-air fuel cell", ECS Trans. 3, 101-114 (2007).
Toussaint et al.; "Development of a rechargeable zinc-air battery", ECS Trans. 28, 25-34 (2010).
Supplementary European Search Report for European Application No. 12785155.8 dated Feb. 24, 2016.

* cited by examiner

ZINC-AIR BATTERY

CROSS-REFERENCE TO RELATED APPLICATIONS

This application is a National Phase Application of PCT International Application No. PCT/IL2012/050172, International Filing Date May 15, 2012, which claims priority of U.S. Provisional Patent Application No. 61/486,348, filed on May 16, 2011, both of which are hereby incorporated by reference.

FIELD OF THE INVENTION

This invention provides novel rechargeable zinc-air cells and composite charging units, which are a low weight, low volume, or higher energy system, or a combination thereof.

BACKGROUND OF THE INVENTION

It is known that metal-air batteries present remarkable characteristics which make them suitable for a number of important uses and that rechargeable zinc-air batteries are well known in the art. In one approach, the battery is recharged solely by application of electric current, however the zinc electrode (in practically relevant limited-electrolyte conditions), does not maintain a compact shape on repeated charge-discharge cycling, either forming zinc dendrites, which short out the cell, or the electrode undergoes zinc shape change, where the zinc tends to redistribute over the lower part of the plate with consequent capacity fading and stack deformation.

Zinc-air primary (non-rechargeable) cells are known in the art, but these cells have limited application. The use of a zinc electrode in a secondary (rechargeable) cell is also known, however, such cells present problems due to the formation of zinc dendrites during the recharging of the cell which will interfere with subsequent oxidation and reduction (discharging and recharging) of the zinc electrode and, thus, reduce the number of cycles during which the cell will deliver its full charging and discharging capabilities. Electrically rechargeable zinc-air cells and batteries incorporating a zinc anode together with a gas diffusion type air electrode cathode usually employ an alkaline electrolyte, where cycle life is often limited by the poor recharge characteristics of the zinc anode. The zinc plate discharge product (zinc oxide) is appreciably soluble in the alkaline electrolyte and tends not to reform the zinc active material on the plate during charge in a reproducible way. In many cases on charge the zinc reforms in an uncontrolled manner and grows towards the positive plate. (air cathode). This can cause cell or battery failure if the zinc shorts across to the positive plate (zinc dendrite failure), in some cases actually puncturing separator layers disposed between the plates or even puncturing the gas diffusion air electrode. Another common failure mode is anode shape change, where the zinc redistributes unevenly on the plate during charge/discharge cycling, causing deformation of the cell stack, and ultimate failure. These failure modes are not necessarily instantaneous in the life of the cell or battery, but can result in a steady falloff of performance (for instance capacity fading and voltage irregularities).

There have been various attempts to overcome this defect in electrically rechargeable zinc-air systems over the years, but none has provided a commercially feasible, long cycle life solution. In one approach the zinc is bonded in place using a polymer binder and additives that inhibit zinc dendrite formation or shape change on charge. In another approach the active zinc is mixed with a material (e.g. calcium oxide) that chemically traps the zinc plate discharge product (zinc oxide) in an insoluble form (in this case calcium zincate) before it can escape by partial dissolution into the alkaline electrolyte. Endurance can also be improved somewhat by incorporation of zinc dendrite-resistant multilayer separator systems that are ultimately punctured by dendrites and usually increase cell resistance. In a yet further approach the zinc active material is contoured and predistributed on the negative plate so as to allow for redistribution at the plate edges where shape change is particularly problematic, or an auxiliary electrode is positioned near the plate edges to dissolve off the excess zinc collecting there. In these and other approaches the occurrence of the problem is merely postponed not remedied.

Some examples of the various methods and schemes proposed to avoid or mitigate the zinc dendrite formation problem include, for example, Bronoel U.S. Pat. No. 4,517,258 which teaches the construction of a cell with a zinc negative electrode comprising spherically shaped particles which circulate in the electrolyte. The particles have a chemically resistant core and are coated with a conductive coating. The particles are charged and discharged by contact with a collector, e.g., they become coated with zinc when in contact with a collector more negative than that corresponding to the zinc deposit and in the presence of a zincate solution. The particles circulate in a KOH electrolyte which is pumped through the battery. The electrolyte drains off into a storage tank from which it is pumped back through the battery. The use of a floating negative electrode is said to inhibit the formation of zinc dendrites. However the circulating zinc particle slurry system adds considerable weight and parasitic load to the battery.

Iacovangelo et al, in an article entitled "Parametric Study of Zinc Deposition On Porous Carbon in a Flowing Electrolyte Cell", published in the Journal of the Electrochemical Society, Volume 132 (1985), at page 851, describe the use of carbon foams as substrates for zinc electrodes in rechargeable zinc-bromine cells. The use of such a carbon foam provides an extended surface area upon which the reduced zinc may be deposited during recharging and reduction of the zinc, as well as a support surface which provides some degree of chemical inertness to the electrochemical reactions occurring in the cell. However, the formation of zinc dendrites on the surface of the foam during reduction of the zinc eventually blocks access to the inner surfaces of the foam and thereby eventually reduces the capacity of the electrode after a number of charging and discharging cycles.

There therefore remains a need to identify and produce a zinc-air cell, which is rechargeable, and does not suffer these limitations.

SUMMARY OF THE INVENTION

This invention provides, in some embodiments, a zinc-air cell, which is rechargeable and which exhibits a longer lifespan than other zinc-air cells.

This invention provides, in some embodiments, a three-electrode rechargeable zinc-air cell, in which zinc dendrite formation upon charge is in a different direction than that normal to the plane between the zinc-incorporating electrode and the air electrode.

This invention provides, in some embodiments, a rechargeable zinc-air cell comprising at least one zinc-incorporating structure, at least one oxygen evolving structure and at least one air electrode, wherein the zinc-air cell comprises a first pair of electrodes for the charging of said zinc-air cell, and a second pair of electrodes for discharging of the zinc-air cell. According to this aspect, the charging electrode pair comprises at least one zinc-incorporating structure and at least one oxygen evolving structure and the discharging electrode pair comprises at least one zinc-incorporating structure and said at least one air electrode. According to this aspect, and in one embodiment, the at least one oxygen evolving structure and at least one air electrode are oriented such that the at least one oxygen evolving structure is positioned distally to or substantially perpendicular to the at least one air electrode.

As described herein and, as will be appreciated by the skilled artisan following a review of the description and drawings provided herein, the invention contemplates two basic orientations to the relative positioning of the oxygen evolving structure with respect to the air cathode, within the zinc-air cells of this invention.

In one embodiment, the zinc-air cells in question will comprise at least three basic elements, which basic elements may be present within such zinc-air cell in single or multiple units. Such three basic elements include a zinc-incorporating structure, an oxygen evolving structure and an air electrode.

According to this aspect, and as contemplated herein, with respect to the zinc-air cells considered to be a part of this invention, one of the two relative positionings of the oxygen evolving structure with respect to the air cathode constitute an orientation such that the oxygen evolving structure is always more proximally located to a zinc incorporating structure and thus more distally located to an air electrode within a zinc-air cell as herein defined. Although the term "proximal" and "distal" are relative indications, in fact, and as will be appreciated by the skilled artisan, since the three basic elements are defined in terms of their relative spatial orientation within the zinc-air cells, such an arrangement is clear irrespective of the shape or number of repeating units of each of the three basic elements, as long as the positioning of the elements is consistent, i.e. the oxygen evolving structure will be proximal to the zinc incorporating structure and distal to the air cathode in any air cell constituting this invention.

Similarly, and representing another embodiment of the invention, and as contemplated herein, with respect to the zinc-air cells considered to be a part of this invention, one of the two relative positionings of the oxygen evolving structure with respect to the air cathode constitutes an orientation such that the oxygen evolving structure is always positioned substantially perpendicularly to the air cathode within the air cells as herein defined.

For the purpose of the description provided herein, it is to be noted that the term "substantially perpendicular" and grammatical forms thereof and the term "substantially not parallel" and grammatical forms thereof are to be considered interchangeable when in reference to the orientation/positioning of the oxygen evolving structure relative to the positioning of the air cathode in the zinc-air cells and charging units of this invention. Whereas in some embodiments, such orientation will be perpendicular, or at a 90 degree angle with respect to each other, other orientations, which approximate the same, such as for example, an orientation of at least some of the oxygen evolving structures in a given zinc air cell of this invention with respect to the air cathode, may be at an angle ranging from about 10 to about 90 degrees and the same is to be considered as part of this invention.

In some embodiments, as will be appreciated by the skilled artisan, the relative orientations of the three basic elements of the zinc air cells of this invention is optimized in order to prevent zinc dendrite formation and/or growth in a direction of the air cathodes of this invention and the relative positioning of the oxygen evolving structure with respect to the air cathode, and the pairing of the zinc-incorporating structure with the oxygen evolving structure for charging, whereas the zinc-incorporating structure is paired with the air cathode for discharging of the air-cell obviates or significantly lessens zinc dendrite formation and/or growth in the direction of the air cathodes of the zinc-air cells as herein described.

In one embodiment, this invention provides a rechargeable zinc-air cell comprising at least one zinc-incorporating structure, at least one oxygen evolving structure and at least one air electrode, wherein:

said zinc-air cell comprises a first pair of electrodes for the charging of said zinc-air cell, said electrode pair comprising said at least one zinc-incorporating structure and said at least one oxygen evolving structure;

said zinc-air cell comprises a second pair of electrodes for the discharging of said air cell, said electrode pair comprising said at least one zinc-incorporating structure and said at least one air electrode; and wherein said at least one oxygen evolving structure and said at least one air electrode are positioned such that said at least one oxygen evolving structure is distal to or substantially perpendicular to said at least one air electrode.

In some embodiments, the at least one zinc-incorporating structure and at least one oxygen evolving structure are positioned to be substantially parallel to each other and in some embodiments, the at least one zinc-incorporating structure and at least one air electrode are positioned to be substantially not parallel to each other.

According to this aspect, and in some embodiments, the at least one zinc-incorporating structure is positioned substantially perpendicularly with respect to the at least one air electrode are each other.

According to this aspect, and in some embodiments, the air cell comprises an array of alternating zinc-incorporating structures and oxygen evolving structures.

In some embodiments, the width of a strip in a zinc incorporating structure is proportionate to a distance between the zinc incorporating structure and that of an adjacently located oxygen evolving structure at a ratio of 1:1 to 1:3.

In other embodiments, the at least one zinc-incorporating structure is distal to said at least one air electrode. According to this aspect, and in one embodiment, the at least one oxygen-evolving structure is positioned substantially between two zinc incorporating structures. According to this aspect, and in one embodiment, the oxygen-evolving structure comprises at least one hydrophobic oxygen evolving electrode arranged such that a pocket is created within said porous hydrophobic oxygen evolving electrodes, which pocket approximates a liquid-free oxygen evolution conduit. According to this aspect, and in one embodiment, the oxygen-evolving structure comprises a pair of hydrophobic oxygen evolving electrodes and said pocket is created between said pair of hydrophobic oxygen evolving electrodes.

In some embodiments, there is at least a first separator positioned within said cell between said zinc incorporating structure and said air electrode.

In some embodiments, the zinc incorporating structure is at least a partially open structure, whereby electrolyte passage through said zinc incorporating structure is attainable.

According to this aspect, and in some embodiments, the zinc-incorporating structure comprises a perforated zinc structure.

In some embodiments, the at least one zinc-incorporating structure and said at least one oxygen evolving structure comprise, independently, a strip, a rod, a wire, a plate, a bar, a foam, a mesh, a fiber or a foil. In some embodiments, the at least one zinc-incorporating structure and said at least one oxygen evolving structure are comprised of rectangular metal strips.

In some embodiments, the term strip is meant to convey an elongated structure, and may include more circular structures such as wire forms or rods, or flattened forms, and both are to be considered as contemplated as part of this invention.

In some embodiments, the at least one zinc-incorporating structure and said at least one oxygen evolving structure, independently, are shaped in the form of a cube, cylinder or sphere.

It should be understood that the invention is contemplated, wherein the at least one zinc-incorporating structure and said at least one oxygen evolving structure may be provided in any geometric shape or form, as will be appropriate for a desired application and the skilled artisan will know how to approximate desired characteristics of the same to suit a particular application, when creating an appropriate zinc-air cell and that the same is to be considered as part of this invention.

In some embodiments, the zinc incorporating anode structure, oxygen evolving structure or a combination thereof is a porous structure.

In some embodiments, the zinc incorporating structure is a conductive substrate comprising a zinc coating or zinc plating. In other embodiments, the zinc incorporating structure comprises polymer bonded zinc and/or zinc oxide strips.

In some embodiments, the electrolyte fluid is aqueous potassium hydroxide or aqueous sodium hydroxide that optionally contains dissolved zinc oxide.

In some embodiments, the at least one substantially parallel oriented oxygen evolving strip is a metal strip coated with an electrocatalyst for oxygen evolution, such as mixed oxides of transition metals. In some embodiments, the metal strip is comprised of nickel, steel, stainless steel or titanium coated with an electrocatalyst. In some embodiments, such electrocatalyst is particularly suited for oxygen evolution. In some embodiments, such electrocatalyst is a mixed oxide of transition metals such as nickel or cobalt, as is well known in the art.

In some embodiments, such arrangement provides for battery recharge at lower voltages, where such electrocatalyst coating also tends to resist zinc deposition and will spontaneously destroy zinc growths on contact (with the zinc dissolving off into the electrolyte as zincate).

In some embodiments, the oxygen evolving structure is coated with an electrocatalyst for oxygen evolution that evolves oxygen at a low overvoltage.

In some embodiments, the zinc incorporating structure, the oxygen evolving structure or a combination thereof comprises a material stable on charge or discharge when subjected to an environment containing alkaline electrolyte.

In some embodiments, the zinc incorporating strip material is nickel, steel, stainless steel, copper, carbon, graphite or titanium. In some embodiments, if the strip base material is not nickel it may be nickel plated, and serve as the zinc-incorporating strip.

In some embodiments, these zinc incorporating structures are advantageously given a surface coating of a material inhibiting zinc self-discharge in alkaline electrolyte while enhancing the zinc adhesion. In some embodiments, examples of coatings include indium, bismuth or lead and their alloys. In some embodiments, such coatings will typically have a high overpotential for hydrogen evolution.

In some embodiments, the invention provides an apparatus comprising a rechargeable zinc-air cell as herein described.

In some embodiments, the invention provides a composite charging unit for incorporation within a zinc-air cell, said composite charging unit comprising alternating, proximally, substantially parallel placed zinc-incorporating structures and oxygen evolving structures.

In some embodiments, the invention provides a composite charging unit for incorporation within a zinc-air cell, comprising at least two zinc-incorporating structures flanking at least one oxygen-evolving structure. According to this aspect and in some embodiments, the unit comprises at least two oxygen-evolving structures located between said at least two zinc-incorporating structures.

In some embodiments, with reference to the composite charging units as described herein, the zinc-incorporating structures are pre-loaded with zinc. In some embodiments, the zinc-incorporating structures and oxygen evolving structures are positioned substantially parallel to each other. In some embodiments, according to this aspect, the charging unit further comprises an insulating tie bar attached to a terminus of the zinc-receiving structures, or the charging unit further comprises an insulating tie bar attached to a terminus of said oxygen evolving structures or both.

In some embodiments, according to this aspect, the width of said zinc-incorporating structures is proportionate to a distance between said zinc-incorporating structures and that of proximally located oxygen evolving structures at a ratio of 1:1 to 1:3. In some embodiments, according to this aspect, the zinc-incorporating structures and oxygen evolving structures comprise, independently, a strip, a rod, a wire, a plate, a bar, a foam, a mesh, a fiber or a foil. In some embodiments, according to this aspect, the zinc-incorporating structures and oxygen evolving structures, independently, are shaped in the form of a cube, cylinder or sphere.

In some embodiments, according to this aspect, the zinc-incorporating structures, and oxygen evolving structures, independently, are porous.

In some embodiments, according to this aspect, the zinc-incorporating structures comprise a conductive substrate comprising a zinc coating or zinc plating.

In some embodiments, according to this aspect, the oxygen evolving structures incorporate or are coated with a catalyst facilitating oxygen evolution.

In some embodiments, according to this aspect, the zinc-incorporating structures, said oxygen evolving structures or a combination thereof comprise a material stable on charge or discharge when subjected to an environment containing alkaline electrolyte. In some embodiments, according to this aspect, the material is nickel, steel, stainless steel, carbon, graphite or titanium.

In some embodiments, this invention comprises a means for enhancing the usable life of a zinc-air cell, wherein such method entails construction and assembly of a zinc-air cell as herein described.

In some embodiments, the method for enhancing the usable life of a zinc-air cell as herein described may be modified to provide for a switching of the polarities of the zinc incorporating structures and the oxygen evolving structures, in some of the embodiments of the zinc-air cells as herein described.

Switching the polarity as thus described may clean off residual zinc on the structures from a cell discharge step and can be carried out, in some embodiments, every cycle, or in some embodiments, at defined intervals, such as, for example, every several cycles. According to this aspect, and in some embodiments, the zinc incorporating structures and oxygen evolving structures in such a cell have a composition that will not deteriorate on use for zinc deposit or oxygen evolution, and furthermore, the strips are noted to lack a catalytic coating that will accelerate zinc self discharge or hydrogen evolution. According to this aspect, and in some embodiments, nickel serves as a suitable substrate for such a strategy.

In some embodiments, it will be appreciated that on charge, all the zinc incorporating structures (which are electrically interconnected) may be joined by a sheathed lead to the negative pole of the (external) charger. Similarly all the oxygen evolving structures in a given zinc-air cell (which are electrically interconnected) may be joined by a sheathed lead to the positive pole of the (external) charger. There is of course no electrical connection between the zinc incorporating structures and oxygen evolving structures.

In some embodiments, zinc buildup is regulated by such parameters as charging current, charging voltage, electrolyte composition, temperature and electrolyte flow. For discharge the zinc incorporating structures (negative) are discharged against at least one air electrode (positive).

It will be apparent to the skilled artisan that in the construction of the zinc-air cells and composite charging units of this invention, that masking of regions where specific zinc deposition is undesirable can be accomplished and such masking is routine in the art, with methods for effecting the same being well known.

All publications, patents, and patent applications mentioned herein are hereby incorporated by reference in their entirety as if each individual publication or patent was specifically and individually indicated to be incorporated by reference. In case of a conflict between the specification and an incorporated reference, the specification shall control. Where number ranges are given in this document, endpoints are included within the range. Furthermore, it is to be understood that unless otherwise indicated or otherwise evident from the context and understanding of one of ordinary skill in the art, values that are expressed as ranges can assume any specific value or subrange within the stated ranges, optionally including or excluding either or both endpoints, in different embodiments of the invention, to the tenth of the unit of the lower limit of the range, unless the context clearly dictates otherwise.

BRIEF DESCRIPTION OF THE DRAWINGS

Various embodiments of the subject zinc air cells are described herein with reference to the figures wherein:

FIG. 5 depicts charge/discharge procedures and the strips/cathode orientation an in embodied composite zinc-incorporating anode structure of this invention.

FIG. 6 depicts a zinc-air cell, similar to the embodied cell of FIG. 2, exchanging the auxiliary simple mesh electrode with a porous hydrophobic gas diffusion (oxygen evolving) electrode (a high magnification of a surface of which is depicted in FIG. 6A). Incorporation of a porous hydrophobic gas diffusion (oxygen evolving) electrode within the cell is shown (FIG. 6B).

DETAILED DESCRIPTION OF THE INVENTION

This invention provides, in some embodiments, a zinc-air cell which provides for longer air cell/battery life as compared to previous zinc-air cells/batteries.

The rechargeable zinc-air cells of this invention will comprise at least one zinc-incorporating structure.

In some embodiments, such a zinc-incorporating structure will comprise a single or a series of parallel oriented zinc receiving structures, such as, for example, strips.

In one embodiment, such a zinc-incorporating structure may include a plate, or any other appropriate structure, which is designed to facilitate zinc redeposition on the structure, on charge. The anode plate, in some embodiments, will further constitute a first series of parallel oriented zinc receiving strips.

In some embodiments, this invention provides a rechargeable zinc-air cell comprising at least one zinc-incorporating structure, at least one oxygen evolving structure and at least one air electrode, wherein:

said zinc-air cell comprises a first pair of electrodes for the charging of said air cell, said electrode pair comprising said at least one zinc-incorporating structure and said at least one oxygen evolving structure;

said zinc-air cell comprises a second pair of electrodes for the discharging of said air cell, said electrode pair comprising said at least one zinc-incorporating structure and said at least one air electrode; and wherein said at least one oxygen evolving structure and said at least one air electrode are oriented such that said at least one oxygen evolving structure is not positioned proximally to or substantially parallel to said at least one air electrode.

According to this aspect, and in some embodiments, the relative orientation of the first pair of electrodes for the charging of the air cell and second pair of electrodes for the discharging of the air cell is such that a zinc dendrite growth in the zinc-air cell is substantially proximal to or directionally toward the oxygen evolving structure and substantially distal to, or at a minimum not directionally toward the air electrode of the zinc-air cells as herein described.

Figure 1A:
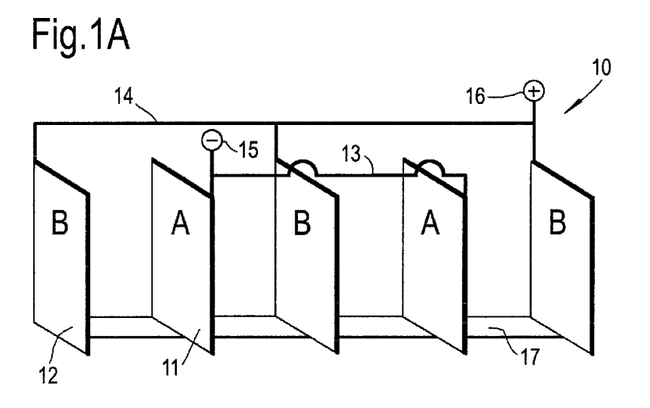
FIG. 1A schematically depicts an embodiment of a composite zinc-incorporating anode structure.

Referring to FIG. 1A, the anode plate 10 may be so constructed so as to comprise two electrically independent sections A and B as a series of narrow elongated parallel metallic strips 11 and 12, respectively. Each section of A and B (11 and 12) strips is connected electrically together by respective leads (13 and 14) to negative and positive terminals 15 and 16, respectively and maintained in this orientation, for example, being maintained rigidly by the presence of an insulating tie bar 17.

Figure 1B:
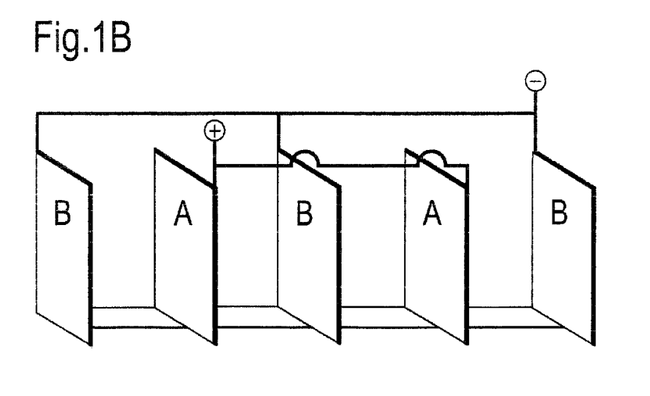
FIG. 1B chematically depicts an embodiment of a composite zinc-incorporating anode structure similar to that of FIG. 1A, having an alternative cell charging strategy than that of FIG. 1A, whereby the strips can be connected to the charge current such that group A is connected to the positive charging pole, and group B is connected to the negative charging pole.

Referring to FIG. 1B, an alternative cell charging strategy is presented whereby the strips can be connected to the charge current such that group A is connected to the positive charging pole, and group B is connected to the negative charging pole. This is as opposed to the connection in FIG. 1A.

Figure 4:
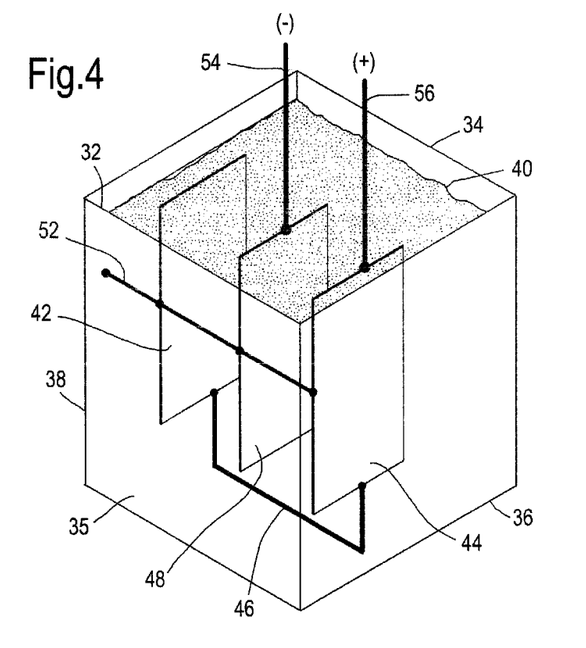
FIG. 4 depicts an embodiment of a zinc-air cell showing a potential orientation of the zinc incorporating structure and oxygen evolving structures within an embodied zinc-air cell.

The orientation of strips within a zinc-air cell according to the present invention is shown in cutaway form in FIG. 4. Two opposing air cathodes 32, 34 fitted with separators (not shown) are bonded to plastic side walls 36, 38 and a plastic base 35, forming a rectangular box like structure which is filled with electrolyte 40. The air cathodes are connected via a lead to the main positive terminal of the cell (not shown). Electrolyte can be pumped through the cell or left unpumped. The composite anode (in this example) comprises three spaced parallel metal strips 42, 48, 44 immersed in the electrolyte and held rigidly in place by means of a plastic tie bar 52. The parallel strips 42, 48 and 44 are in fact spaced from and substantially perpendicular to the air cathodes. Strips 42 and 44 are for oxygen evolution on charge, electrically connected by a sheathed jumper lead 46 and strip 44 is fitted with a sheathed lead 56 proceeding from it to the cell supplementary positive terminal (not shown). The inner strip 48 is configured to receive zinc on charge and a sheathed lead 54 proceeds from it to the cell negative terminal (not shown). On discharge the strip 48 having built-up zinc on both sides (negative polarity) is discharged against the two air cathodes (positive polarity).

Figure 5A:
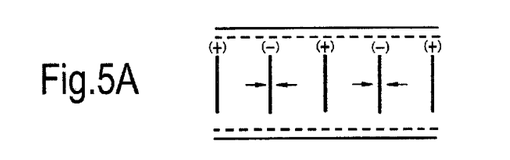
In FIG. 5A a five strip composite anode is seen, depicting the strip polarities.
Figure 5B:
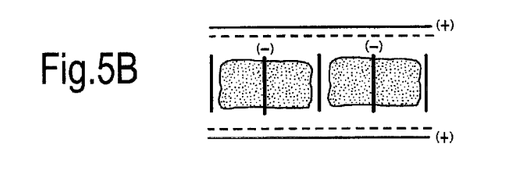
In FIG. 5B the status on discharge is indicated with the zinc coated second and fourth strips (negative polarity) being discharged against the two air cathodes (positive polarity).
Figure 5C:
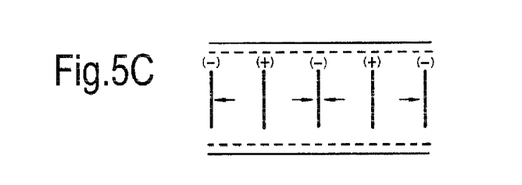
FIG. 5C, similar to FIG. 5A depicts a five strip composite anode, depicting the direction of zinc plating on the composite anode.
Figure 5D:
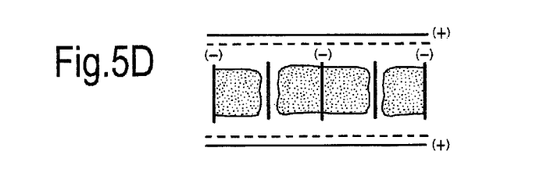
In FIG. 5D the status on discharge is indicated with the zinc coated strips (negative polarity) being discharged against the two air cathodes (positive polarity).

According to this aspect, charge/discharge procedures and the strips/cathode orientation in such a system are shown schematically as a top view in FIGS. 5A and 5B. In FIG. 5A a five strip composite anode is seen, where the polarities on each strip are indicated. The arrows show the direction of zinc plating on charge on each side of the second and fourth strips (negative polarity) while the other strips (first third and fifth) evolve oxygen (positive polarity). In FIG. 5B the status on discharge is indicated with the zinc coated second and fourth strips (negative polarity) being discharged against the two air cathodes (positive polarity). FIGS. 5A and 5B also show the deployment of separators close to the two air cathodes. Similarly with application of the alternative charging strategy, in FIG. 5C we see the direction of zinc plating on the composite anode. In FIG. 5D the status on discharge is indicated with the zinc coated strips (negative polarity) being discharged against the two air cathodes (positive polarity). The composite anode can be charged either in the polarity described in FIG. 1A, or the polarity described in FIG. 1B. Additionally, charging direction may be alternating on subsequent cycles or periodically.

Figure 2:
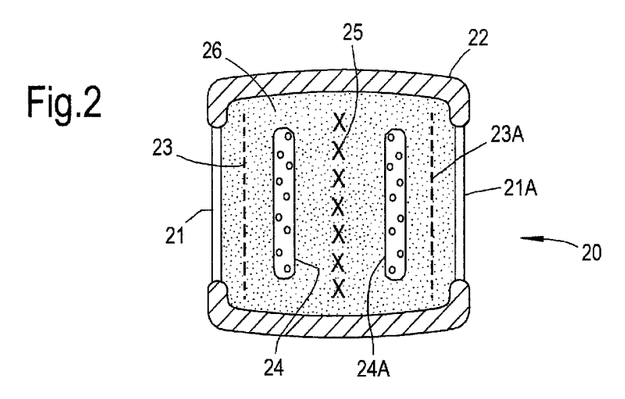
FIG. 2 schematically depicts an embodiment of a zinc-air cell of this invention.
Figure 3A:
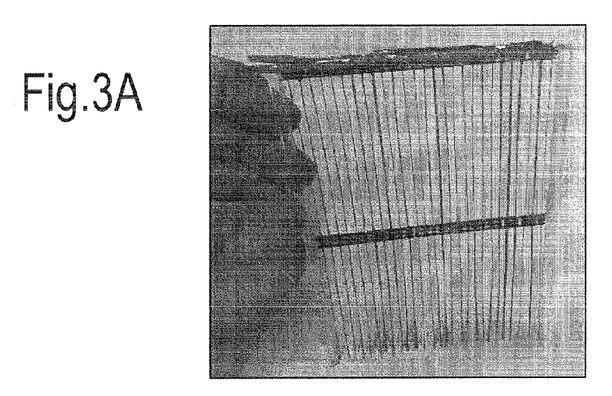
FIG. 3 depicts a series of photographs of an embodied zinc-incorporating structure and oxygen evolving structure of this invention, which in some embodiments, represents a composite charging unit of this invention.
Figure 3B:
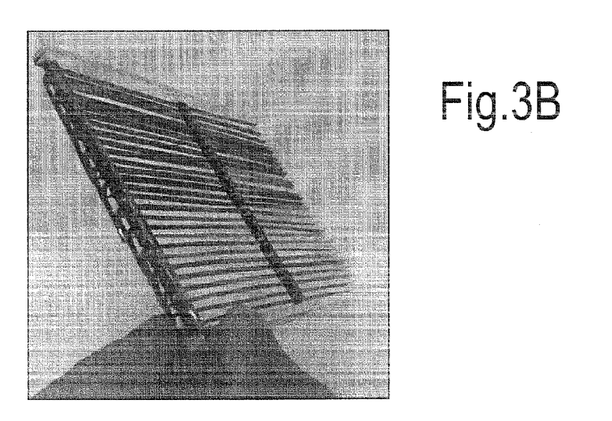
Figure 3C:
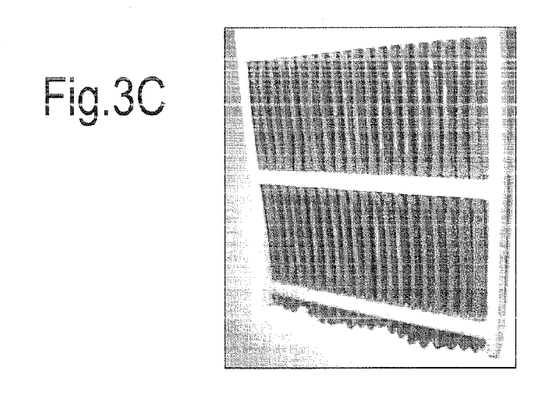
Figure 6A:
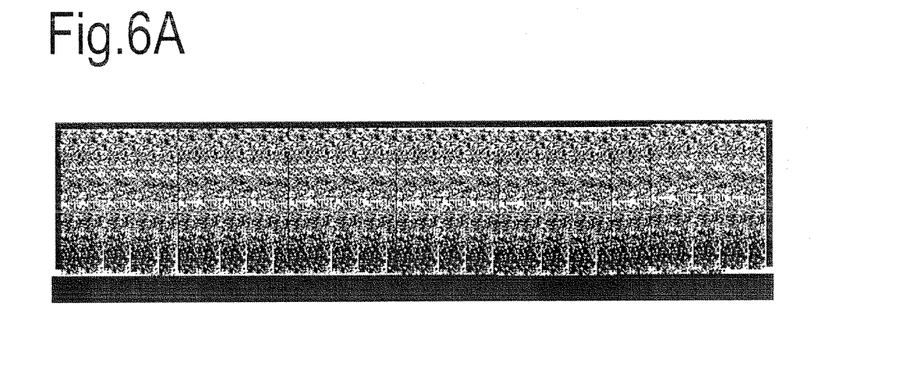
Figure 6B:
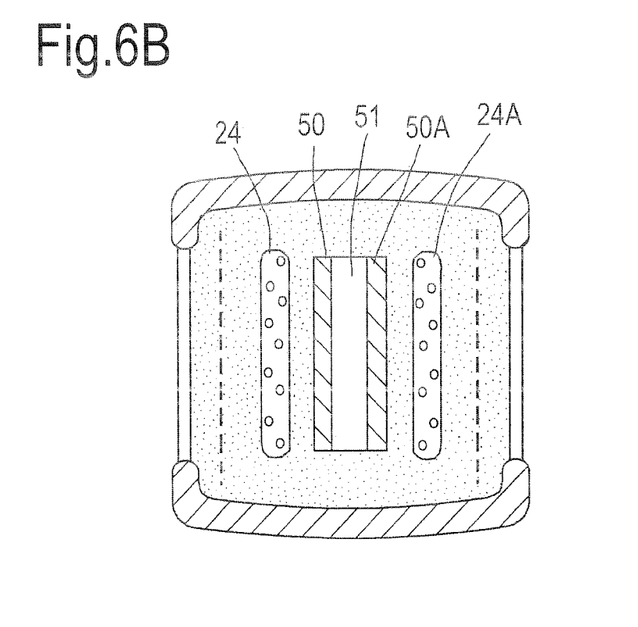

The composite anode described in FIG. 4 effectively prevented zinc deposition on charge in the cell in the direction of the air cathode. Another scheme for achieving this is shown in FIG. 2. A zinc-air cell 20 is configured with two opposed air cathodes 21, 21A with attached separators 23, 23A and bonded to a plastic case (partially shown as 22). The cell contains alkaline zincate electrolyte 26 which may be pumped through the cell or left unpumped. Adjacent to each air cathode is a porous anode structure for receiving zinc (24, 24A) comprising a nickel mesh or foam coated with a layer of indium or bismuth to inhibit zinc self discharge, and between anodes 24 and 24A is placed an auxiliary (or charge) electrode 25 in its simplest version in mesh form for charging the zinc. The auxiliary electrode comprises a nickel mesh coated with an electrocatalyst for oxygen evolution. Useful electrocatalysts for oxygen evolution are mixed transition metal oxides such as nickel cobalt oxides. The cell is charged by applying current from an external charger to the porous anodes (as negative) versus the auxiliary electrode (as positive). Zinc builds up on the porous anodes on the side opposite to the air cathodes, with the anode porosity selected such that the zinc deposit does not close off the pores. For discharge the anodes (negative) are discharged against the air cathodes (positive). An additional enhancement to the cell described in FIG. 2 is obtained by replacing the auxiliary (charge) simple mesh electrode (25) with a porous hydrophobic gas diffusion (oxygen evolving) electrode, such as the one depicted in FIG. 6A. The porous charge electrode is supported on a current carrying mesh, is catalyzed with a catalyst having a low oxygen evolution overpotential, and is also hydrophobic. The current collecting tab of the electrode is not shown in the drawing. By installing two electrodes (50 and 50A in FIG. 6B) as a back-to-back pocket construction, a liquid-free oxygen evolution pipe is formed within the cell. This allows for efficient removal of the oxygen that is generated on the charge electrode during the charge process in the cell without any troublesome oxygen gassing within the cell electrolyte. Oxygen evolved as bubbles within the cell electrolyte from a simple mesh- or foil-based auxiliary (charge) electrode can cause resistance losses in the cell and continuous fluid loss via entrained moisture/alkali passing out with the bubbles. Such a back-to-back pocket electrode can advantageously also be catalyzed with a catalyst for oxygen reduction and can be used during discharge of the centrally placed zinc anode.

Figure 7A:
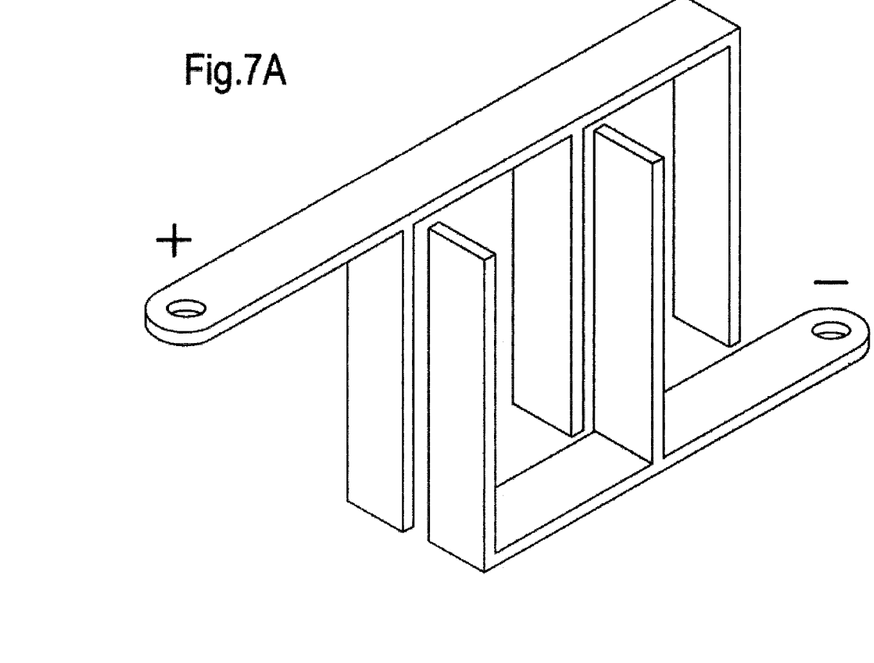
FIG. 7A-7B depict embodiments of a zinc-air cell of this invention, describing embodied orientations and potential shapes of a zinc incorporating structure and oxygen evolving structure and potential relative positioning of the same.
Figure 7B:
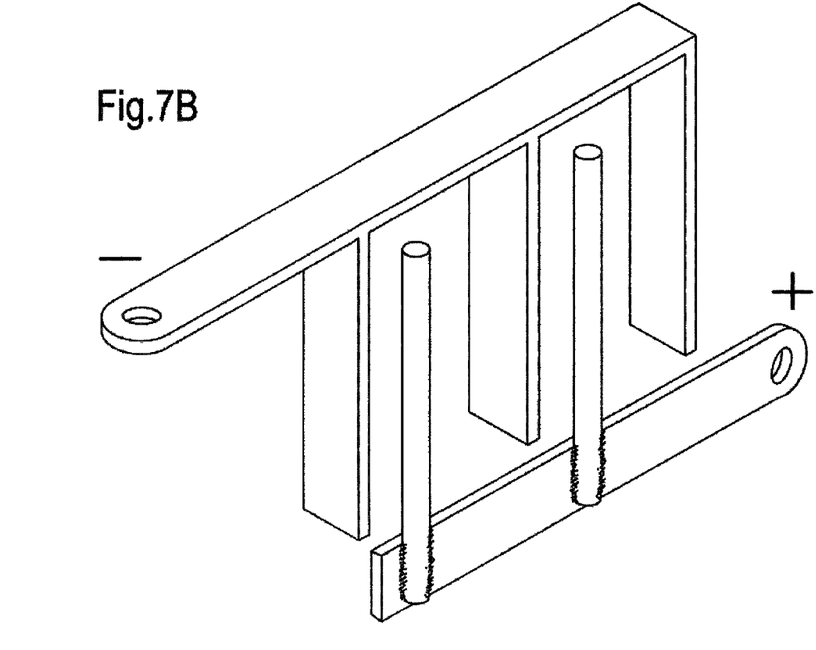

Referring to FIGS. 7A and 7B, as will be appreciated by the artisan, a similar construction of the alternating arrangement of zinc incorporating and oxygen evolving structures as was shown in FIG. 1 is depicted, whereby the electrically independent zinc incorporating and oxygen evolving structures (comparable to sections A and B as depicted in FIG. 1) are shown as a series of narrow elongated parallel metallic strips or as alternating as a series of narrow elongated parallel metallic strips and a series of narrow wires (FIGS. 7A and 7B, respectively).

Figures 8A, 8B:
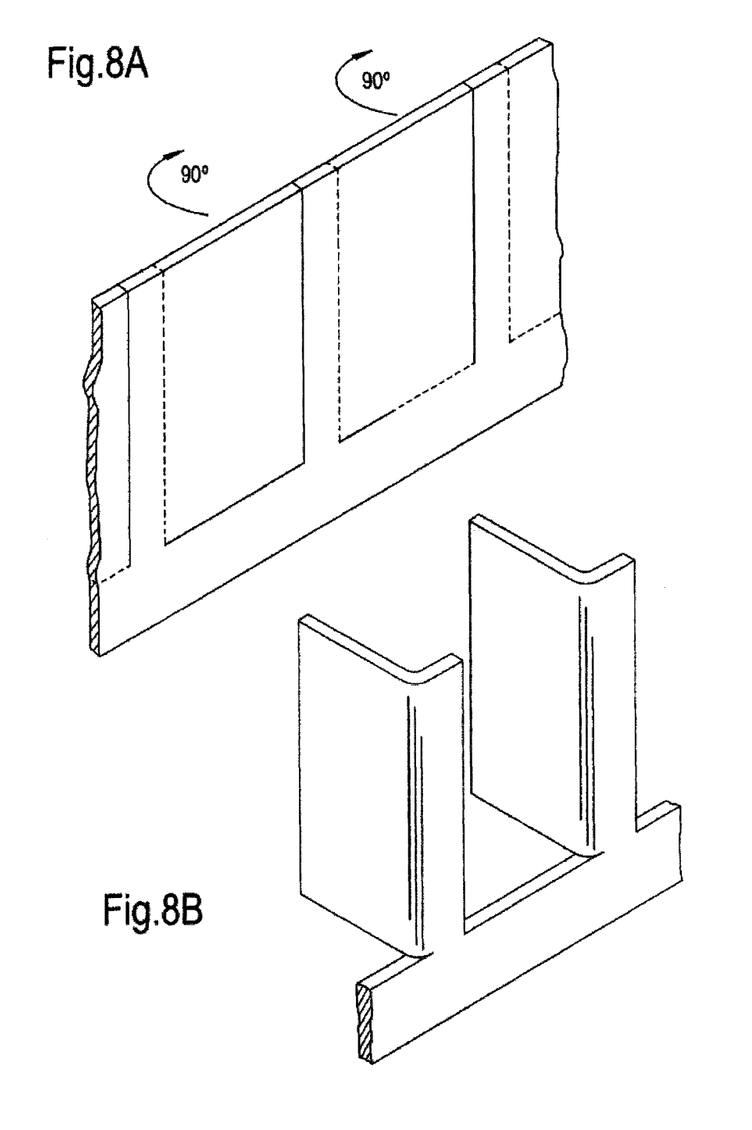
FIG. 8 depicts yet another embodiment of a zinc-air cell of this invention, indicating one embodied means of assembling the alternating zinc incorporating structure and oxygen evolving structures depicted in FIG. 8C.
Figure 8C:
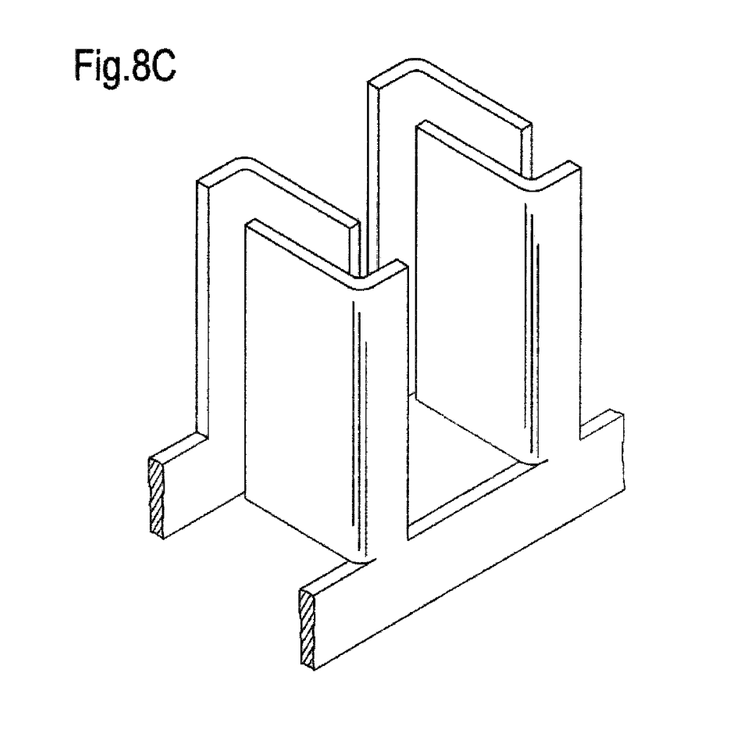

The zinc-air cell components can be manufactured in a simple and cost-effective manner, for example, as depicted in FIG. 8. According to this aspect, and in some embodiments, when a composite charging unit as depicted in FIG. 7A is to be constructed or approximated, a metal sheet may be cut along, for example, the dotted lines as depicted in FIG. 8, and the liberated strip as shown herein may be raised and bent through 90 degrees as depicted to form the orientation shown in FIG. 8B. Oxygen evolving structures may be similarly prepared and the resultant structures may be assembled to form the alternating structures seen in FIG. 8C.

The described and depicted embodiments of the zinc-air cell and composite charging units as herein described are intended to illustrate but not limit the present invention.

It will be appreciated that the zinc incorporating structures or oxygen evolving structures can be of any size or overall geometry, suitable or applicable for a particular zinc-air cell and may be rectangular, square, oval, circular, and other suitable shapes. In some embodiments, such zinc incorporating structures or oxygen evolving structures will be of any elongated desired shape, or any geometry suitable for the application of the zinc air cell and such varying shapes shall not be in any way limited in their application within the zinc-air cells of this invention.

It will also be appreciated, that when referring to a particular orientation of the zinc incorporating structures or oxygen evolving structures, as being substantially parallel oriented, the term "substantially" is meant to include a less than perfect parallel orientation as part of the contemplated orientations for the elements as herein described. Thus, when the term "substantially" is used to describe at least one substantially parallel oriented oxygen evolving structure, or a first series of substantially parallel oriented zinc incorporating structures, then such orientation is to be understood as substantially parallel, but not necessarily perfectly parallel over the entire length of the indicated structure or over all of the strips, for example, within a structure.

Similarly, when referring to an air electrode oriented such that the air electrode is substantially perpendicular in orientation to a direction of zinc deposition in the zinc incorporating structure, or composite charging unit as herein described, that it is understood that the invention contemplates an orientation of an air electrode cathode that is substantially perpendicular, but not perfectly perpendicular in orientation. Thus, for example, such orientation may be at, in some embodiments, 60, or in some embodiments, 63, or in some embodiments, 65, or in some embodiments, 67, or in some embodiments, 70, or in some embodiments, 73, or in some embodiments, 75, or in some embodiments, 77, or in some embodiments, 80, or in some embodiments, 83, or in some embodiments, 85, or in some embodiments, 87, or in some embodiments, 88, or in some embodiments, 89, or in some embodiments, 91, or in some embodiments, 92, or in some embodiments, 93, or in some embodiments, 95, or in some embodiments, 98 degrees and nonetheless, such orientation is to be considered to be a part of the instant invention.

In some embodiments, such zinc incorporating structures or oxygen evolving structures shall be of any appropriate desired thickness to suit a particular zinc-air cell. In some embodiments, the thickness will range from about 0.1 mm to about 1 mm According to this aspect, and in some embodiments, below about 0.1 mm thick the strips are rather thin and will not easily maintain a self standing parallel configuration (causing shorts), also ohmic losses along the length of the strips are excessive. According to this aspect, and in some embodiments, above about 1 mm thick the zinc incorporating structures are rather heavy for the zinc they will carry and may reduce the available thickness for zinc growth.

In some embodiments, such zinc incorporating structures or oxygen evolving structures shall be composed of any material suitably stable on charge or discharge when contained in a casing comprising an alkaline electrolyte. In some embodiments, such material may include, inter alia, nickel, stainless steel, titanium or any other metal or metal alloy. In some embodiments, such material may be in the form of a foil, mesh, foam or fiber form.

In some embodiments, such zinc incorporating structures may be comprised of, inter alia, carbon or graphite or other suitable materials, as are known in the art. In some embodiments, such zinc incorporating structures may be comprised of, inter alia, a soluble zinc electrode, a bonded zinc oxide material, or others. In another embodiment, the bonded zinc oxide zinc receiving strips may comprise zinc, zinc oxide and polymer binder pressed on the metal strip support.

In some embodiments, such zinc incorporating structures may be comprised of, inter alia, any suitable material (nickel, steel, stainless steel, titanium, copper or graphite and comprising a further coating, for example, a coating of indium, bismuth, lead or their alloys, which in some embodiments may promote more uniform zinc deposition on charge on the zinc incorporating structures, or minimize self discharge on stand, or a combination thereof. In some embodiments, the electrocatalyst for oxygen evolution is a mixed oxide from transition metals such as nickel and cobalt as is well known in the art. In some embodiments, the zinc incorporating structures or oxygen evolving structures are porous structures.

In some embodiments, the oxygen evolving structures may comprise any suitable material as described hereinabove. In some embodiments, such oxygen evolving structures may comprise a further coating containing a catalyst, which catalyst augments or initiates oxygen evolution, and in some embodiments, augments or initiates oxygen evolution at low overvoltage, for example, when such strips carry transition metal oxides.

In some embodiments, the zinc-air cell will further comprise at least one parallel oriented oxygen evolving strip. In some embodiments, if such zinc-air cell comprises only a single parallel oriented oxygen evolving strip then such strip is located between two of said parallel oriented zinc incorporating strips. In some embodiments, if such zinc-air cell comprises a second series of parallel oriented oxygen evolving strips, then such parallel oriented oxygen evolving strips are oriented in an alternating manner between a first series of parallel oriented zinc incorporating structures.

Referring now to an embodiment represented in FIG. 1A, both the parallel oriented zinc incorporating strips 11 and parallel oriented oxygen evolving strips 12 are positioned in an alternating manner, represented as an B, A, B, A, B, A sequenced configuration.

The zinc-air cells of this invention will further comprise at least one air electrode, which air electrode is oriented such that the air electrode is substantially perpendicular in orientation to a direction of zinc deposition in the zinc incorporating structure.

According to this aspect, and in some embodiments, the first series is electrically connected to a negative terminal and said at least one parallel oriented oxygen evolving strip is electrically connected to a positive terminal and whereby upon immersion of the composite zinc incorporating anode structure and applying current to the first series and the at least one parallel oriented oxygen evolving strip, at least a small amount of zinc is deposited on the first series of parallel oriented zinc incorporating strips or on a face of the zinc incorporating strips proximal in orientation to the at least one parallel oriented oxygen evolving strip Further according to this aspect, the zinc-air cells of this invention will further comprise at least one air electrode oriented such that the air electrode is substantially perpendicular in orientation to a direction of zinc deposition in the zinc incorporating structure. According to this aspect, because the zinc deposition is not substantially parallel in orientation to the air electrode, therefore, in some embodiments, zinc dendrite failure and air cathode puncture are mitigated or abrogated.

In one embodiment, and illustrative of the principle of operation of other embodied zinc-air cells of this invention, referring to FIG. 1A, the zinc-air cell, during charge is configured such that strips A (11) receive zinc while strip(s) B effectively function as a recharge electrode, evolving oxygen.

The composite assembly 10, when fully immersed in the electrolyte solution (e.g. KOH) in the cell, when positioned normal to and spaced from the two air electrodes and supplied with charge current between strips 11 and 12, A and B, respectively, can take up on the A strips a plated deposit of zinc from soluble zinc species (such as zinc oxide) in the alkaline electrolyte, in static condition or in flowing electrolyte conditions as required.

In the cell use of a separator between the composite anode and discharge air electrode cathodes may be optionally incorporated.

In some embodiments the outermost strips in the composite anode are oxygen evolving strips. It will be appreciated that the zinc-air cells of this invention, regardless of which strips are terminally located in the zinc-air cells of this invention facilitate the confining of the zinc growth direction within a plane perpendicular to the air electrode.

Referring again to FIG. 1A, as is readily appreciated by the skilled artisan, indeed the various options for length, width, thickness and inter-separation distance of the strips and distance between anode and cathode may be selected consistent with such factors as the charge/discharge current density, charge time, electrolyte volume and plate capacity required.

In this invention the air cathodes are only required for discharge allowing selection and optimization for performance, cost and life (since they do not have to trade off any properties needed for recharge capability as in the case with bifunctional air electrodes) Similarly the recharge strips can be optimized for low cell charge voltages with the help of the catalyst selected for low oxygen evolution overpotential, thereby lowering cell charge voltages and increasing voltage efficiency and energy efficiency. These strips are also in place for periodic maintenance of zinc growth on strips A, since by deliberate external shorting out of A and B strips (or periodic switching of charging polarities of these strips) there is rapid clean-off of unwanted zinc deposits.

In some embodiments, the zinc-air cells of this invention further comprise an insulating tie bar, attached to a terminus of each of the strips in the first series of electrically independent parallel oriented zinc receiving strips and the at least one parallel oriented oxygen evolving strips.

According to this aspect, and in some embodiments, the insulating tie bar is comprised of a material, such as, for example, a strip with fitted slots, a bar to which the strips are bonded/welded or otherwise affixed. In some embodiments, the tie bar keeps the strips rigidly held in place, for example, to prevent a short. In some embodiments, the tie bar will be comprised of any appropriate material such as, for example, a material that is alkali resistant, such as electrically insulating plastics for example as PP, PE, PVC, nylon or rubber.

In some embodiments, the zinc-air cells of this invention further comprise a casing in which the zinc incorporating structure, oxygen evolving structure and at least one air electrode are positioned. The casing, according to this aspect, is sized and appropriate for the incorporation and/or immobilization of such the zinc incorporating structure, oxygen evolving structure and at least one air electrode. In some embodiments, such casing may be comprised of any appropriate material, such as plastics and other appropriate materials, amenable to the incorporation of the elements as described herein and of a material, which will appropriately encase the same, as well as contain incorporated electrolyte fluid. In some embodiments, the casing may comprise slots in the casing to keep or provide structure for the anode/cathode. In some embodiments, other elements may be included, such as, for example an electrically floating catalytic plate at the bottom of the cell to dissolve any zinc particles shedding from the anode plate.

In some embodiments, the zinc-air cells of this invention include a first series of parallel oriented zinc incorporating structures, such as for example, strips, which strips have a width proportionate to a distance between a zinc receiving strip and that of an adjacently located alternately placed oxygen evolving structure/strip at a ratio of 1:1 to 1:3.

In some embodiments, the at least a first separator positioned within said cell between said a zinc incorporating structure/oxygen evolving structure and said air electrode.

In some embodiments, the electrolyte fluid is potassium hydroxide or sodium hydroxide optionally containing dissolved zinc oxide as zincate.

Referring now to FIG. 2, a top view of an alternative embodied zinc-air cell is schematically depicted. According to this aspect, the zinc-air cell 20 comprises at least one composite zinc-incorporating anode structure 24, 24A. The zinc-incorporating anode structure further comprises a first series of parallel oriented zinc receiving strips 24 and 24A, and at least one parallel oriented oxygen evolving strip 25 located, as depicted, therebetween.

According to this aspect zinc-air cell further comprises at least one air electrode discharge cathode of said cell oriented such that the air electrode cathode is perpendicular in orientation to a direction of zinc deposition in the zinc incorporating structure/oxygen evolving structure which in some embodiments, may be viewed as a composite zinc incorporating structure. FIGS. 4 and 5 exemplify the same.

According to this aspect, and in some embodiments, the zinc-air cell may further comprise at least one separator 23 located between the discharge cathode 21/21A and the series of parallel oriented zinc receiving strips 24 and 24A.

According to this aspect, and in some embodiments, the zinc-air cell further comprises a casing 22 in which said composite zinc incorporating structure and said at least one air electrode discharge cathode are positioned. In some embodiments, the casing encompasses all of the components of the cell, and in some embodiments, the casing will orient and substantially contain most, but not all of the components of the cell, for example, as depicted in FIG. 2. The casing may, in some embodiments contain an electrolyte fluid applied thereto, which may be sold as a pre-filled, fully assembled zinc-air cell.

In some embodiments, the invention provides an apparatus comprising a zinc-air cell as herein described.

While various embodiments of the present invention have been presented, it is possible to use various alternatives, modifications and equivalents. It is to be understood that any feature described herein, may be combined with any other feature described herein. It is to be understood that the article "a", or "an" refers to a quantity of one or more of the item following the article, except where expressly stated otherwise.

EXAMPLES

Example 1

A zinc-air cell was constructed from two parallel air cathodes fitted with porous separators and flanking a central composite anode. The air cathodes were connected by a lead to the main positive terminal of the cell. The composite anode comprised twenty seven parallel nickel strips each length 100 mm, thickness 0.2 mm and width 3 mm spaced 4 mm apart and rigidly supported by polypropylene tie bars at the top and middle of the strips. The strips were assembled such that the first strip had a coating of a nickel cobalt oxide electrocatalyst for oxygen evolution, the second strip in line has an indium coating for zinc deposition and so on through the series of strips with the final one of the series, the nickel cobalt oxide coated nickel. All the strips for oxygen evolution were electrically connected together using sheathed leads and were connected to a lead proceeding to a supplementary positive terminal of the cell. All the strips for zinc deposition were electrically connected together using sheathed leads and were connected to a lead proceeding to a negative terminal of the cell. From an external reservoir an excess of 30 wt % potassium hydroxide solution containing 50 gm/L dissolved zinc oxide was pumped through the cell. On charge all the zinc receiving strips were connected to the negative terminal of an external charger and all the oxygen evolving strips were connected to the positive terminal of the charger. A current of 5 A was passed for 5 hr at an average charge voltage of 2.1V. On inspection of the cell at the end of charge it could be seen that an adherent zinc deposit had nearly filled the gaps between the strips without shorting but that no zinc had grown towards the air cathodes. For discharge the zinc receiving strips (negative) and the two air cathodes (positive) were connected across a constant current load of 5 A, giving an average discharge voltage of 1.2V and providing a discharge capacity of 22 Ah. Coulombic efficiency on charge/discharge was 88%. The cell was cycled for at least 60 cycles with no drop in performance.

While the disclosure has been illustrated and described, it is not intended to be limited to the details shown, since various modifications and substitutions can be made without departing in any way from the spirit of the present disclosure. As such, further modifications and equivalents of the invention herein disclosed can occur to persons skilled in the art using no more than routine experimentation, and all such modifications and equivalents are believed to be within the spirit and scope of the disclosure as defined by the following claims.

What is claimed is:

1. A rechargeable zinc-air cell comprising at least one zinc-incorporating structure, at least one oxygen evolving structure and at least one air electrode, with a common electrolyte;
   wherein said at least one zinc-incorporating structure is used for zinc plating and said at least one oxygen evolving structure is used for oxygen evolution during charging of said zinc-air cell,
   wherein said at least one zinc-incorporating structure is used as the anode and said at least one air electrode is used as a cathode for discharging of said zinc-air cell,
   and wherein the zinc dendrite growth direction on charge is configured to be in a different direction than the direction towards the air electrode; and
   wherein a plane in which said at least one zinc-incorporating structure is disposed and a plane in which said at least one oxygen evolving structure is disposed are positioned at an angle of about 90 degrees with respect to a plane in which said at least one air electrode is disposed.

2. The rechargeable zinc-air cell of claim 1, wherein said at least one zinc-incorporating structure is positioned substantially between two of said oxygen-evolving structures and wherein said at least one zinc-incorporating structure and said two oxygen-evolving structures are positioned perpendicular to said two of said air electrodes and wherein said at least one zinc-incorporating structure and said two oxygen-evolving structures are positioned substantially parallel to each other.

3. The rechargeable zinc-air cell of claim 1, wherein said oxygen-evolving structure comprises at least one hydrophobic oxygen evolving electrode(s) arranged such that a pocket is created within or between said porous hydrophobic oxygen evolving electrode(s), which pocket approximates a liquid-free oxygen evolution conduit.

4. The rechargeable zinc-air cell of claim 1, wherein said zinc-air cell comprises an array of alternating zinc-incorporating structures and oxygen evolving structures and wherein said alternating zinc-incorporating structures are positioned substantially parallel to said oxygen evolving structures.

5. The rechargeable zinc-air cell of claim 4, wherein said array further comprises an insulating tie bar attached to a terminus of said zinc-incorporating structures, an insulating tie bar attached to a terminus of said oxygen evolving structures or a combination thereof.

6. The rechargeable zinc-air cell of claim 1, wherein said at least one zinc-incorporating structure and said at least one oxygen evolving structure comprise, independently, a strip, a rod, a wire, a plate, a bar, a foam, a mesh, a fiber or a foil.

7. The rechargeable zinc-air cell of claim 1, wherein said zinc-incorporating structures, and said oxygen evolving structures, independently, are porous.

8. The rechargeable zinc-air cell of claim 1, wherein said oxygen evolving structures incorporate or are coated with a catalyst facilitating oxygen evolution.

9. The rechargeable zinc-air cell of claim 1, wherein said zinc-incorporating structures, said oxygen evolving structures or a combination thereof comprise a material stable on charge or discharge when subjected to an environment containing alkaline electrolyte.

10. The rechargeable zinc-air cell of claim 9, wherein said material is nickel, steel, stainless steel, carbon, copper, graphite or titanium optionally coated with nickel.

11. The rechargeable zinc-air cell of claim 9, wherein said zinc-incorporating structures are preloaded with zinc.

12. The rechargeable zinc-air cell of claim 1, wherein said zinc incorporating structure comprises a conductive substrate supporting a zinc coating or a zinc plating.

13. The zinc-air cell of claim 1, wherein said zinc-incorporating structure(s) are connected to one electrical terminus, said oxygen evolving structure(s) are connected to one electrical terminus and said air electrode(s) are connected to one electrical terminus.

14. The rechargeable zinc-air cell of claim 1, wherein said at least one zinc-incorporating structure is partially open, porous or perforated.

15. The rechargeable zinc-air cell of claim 1, wherein separators are inserted between any of said structures.

16. A method of operating the zinc-air cell according to claim 1, said method comprising:
   a. electrically-contacting said zinc-incorporating structure(s) and said air electrode(s) to provide for discharge of said cell;

b. electrically-disconnecting said zinc-incorporating structure(s) and said air electrode(s) to stop discharge of said cell;
c. electrically-contacting said zinc-incorporating structure(s) and said oxygen-evolving structure(s) to provide for charging of said cell; and
d. electrically-disconnecting said zinc-incorporating structure(s) and said oxygen-evolving structure(s) to stop charging of said cell.

\* \* \* \* \*